US009164960B2

(12) United States Patent
Hatsutori et al.

(10) Patent No.: US 9,164,960 B2
(45) Date of Patent: Oct. 20, 2015

(54) MATRIX STORAGE FOR SYSTEM IDENTIFICATION

(71) Applicant: International Business Machines Corporation, Armonk, NY (US)

(72) Inventors: Yoichi Hatsutori, Tokyo (JP); Hisashi Miyashita, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 13/718,652

(22) Filed: Dec. 18, 2012

(65) Prior Publication Data

US 2013/0159373 A1     Jun. 20, 2013

(30) Foreign Application Priority Data

Dec. 19, 2011 (JP) .................. 2011-277384

(51) Int. Cl.
*G06F 17/16* (2006.01)
*G06F 17/18* (2006.01)

(52) U.S. Cl.
CPC ................ *G06F 17/16* (2013.01); *G06F 17/18* (2013.01)

(58) Field of Classification Search
CPC ...................................... G06F 17/16
See application file for complete search history.

(56) References Cited

U.S. PATENT DOCUMENTS

2002/0128751 A1  9/2002  Engstrom et al.
2007/0055392 A1  3/2007  D'Amato et al.

FOREIGN PATENT DOCUMENTS

| JP | 6395568 A | 4/1988 |
|---|---|---|
| JP | 06214610 A | 8/1994 |
| JP | 09212483 A | 8/1997 |
| JP | 2010122850 A | 6/2010 |

OTHER PUBLICATIONS

Aykanat et al, Implementation of the Conjugate Gradient Algorithm on a Vector Hypercube Multiprocessor, 1988, ACM, pp. 1687-1697.*
Kubota, Yuji et al, Optimization of Sparse Matrix-Vector Multiplication by Auto Selecting Storage Schemes on GPU, Jun. 20-23, 2011, International Conference on Computational Science and its Applciations, Part II, pp. 547-561.*

(Continued)

*Primary Examiner* — Chat Do
*Assistant Examiner* — Calvin M Brien
(74) *Attorney, Agent, or Firm* — Jennifer Davis; Ryan, Mason & Lewis, LLP

(57) ABSTRACT

A sparse matrix used in the least-squares method is divided into small matrices in accordance with the number of elements of observation. An observation ID is assigned to each element of observation, a parameter ID is assigned to each parameter, and the IDs are associated with parameters of elements as ID mapping. A system determines positions of nonzero elements in accordance with whether or not ID mapping exists, the correspondence between observation IDs and parameter IDs, and the positions of the small matrices, and selects a storage scheme for each small matrix based thereon. The system selects a storage scheme in accordance with conditions, such as whether or not a target element is a diagonal element, whether or not a term decided without ID mapping exists, and whether or not the same ID mapping is referred to.

15 Claims, 8 Drawing Sheets

(56) References Cited

OTHER PUBLICATIONS

Y. Kubota et al., "Optimization of Sparse Matrix-Vector Multiplication by Auto Selecting Storage Schemes on GPU", research reports of Information Processing Society of Japan [high-performance computing], 2010-HPC-128(19), pp. 1-7, 2010.

R. H. Bisseling et al., "Communication Balancing in Parallel Sparse Matrix-Vector Multiplication", Electronic Transactions on Numerical Analysis, vol. 21, pp. 47-65, 2005.

K. Hayami et al., "The use of the scaled conjugate gradient algorithm on vector processors", research reports of Information Processing Society of Japan, high-performance computing (HPC), vol. 1986, No. 40 (1986-HPC-017) pp. 1-6, 1986.

* cited by examiner

FIG. 13

| DIA | CSR | CSR |
|-----|-----|-----|
| ELL | DIA | CSR |
| CSR | CSR | CSR |

MATRIX STORAGE FOR SYSTEM IDENTIFICATION

PRIORITY CLAIM

The present application claims priority to the Japanese patent application identified as 2011-277384, filed on Dec. 19, 2011, and entitled "Matrix Storage Method for System Identification, Program Product, and System," the disclosure of which is incorporated by reference herein in its entirety.

FIELD

The field relates generally to system identification based on a parametric model, and more specifically to a matrix storage method for system identification based on a systems model.

BACKGROUND

Hitherto, in system identification based on a parametric model, an objective function for parameter estimation including a prediction error is constituted, and a process of deciding parameters to minimize the objective function is performed. The objective function that is most normally used is a quadratic function. In this case, the process of deciding parameters to minimize the objective function is called "least-squares method estimation."

Parameters to be identified are defined as $x=(x_1, \ldots, x_m)$ and plant models are defined as $\hat{f}(x)$.

A problem of deciding parameters using the least-squares method is defined by the following expression as a problem of deciding parameters which allow square error $\epsilon^2$ with respect to observation values $f_i$ (i=1, ..., n) to be minimized. Here, m and n are natural numbers and m<n is satisfied:

$$\varepsilon^2 = \sum_{i=1}^{n} (f_i - \hat{f}(x))^2$$

Then, it is a problem of identifying m parameters on the basis of the following m simultaneous equations obtained by performing partial differentiation on the square error $\epsilon^2$ by using the individual parameters. The simultaneous equations are defined as normal equations where $$\frac{\partial \varepsilon^2}{\partial x} = 0.$$

Thus, the problem to be solved by using the least-squares method is defined as follows:

$$\left[\sum_n \left(-\frac{\partial \varepsilon}{\partial x}\right)\left(-\frac{\partial \varepsilon}{\partial x^T}\right)\right] \cdot \Delta x = \sum_n \left(-\frac{\partial \varepsilon}{\partial x}\right) \epsilon.$$

Here, the following expression is obtained when terms of partial differentiation are expressed by matrix A:

$$A^T A \cdot \Delta_x = A^T \epsilon.$$

When this expression is transformed by replacing $\Delta x$ by $\hat{\theta}$, the following expression is obtained:

$$\hat{\theta} = (A^T A)^{-1} A^T \epsilon$$

where $\epsilon$ is the difference between observation value $f_i$ and plant model $\hat{f}(x)$ and $\hat{\theta}$ is the estimated value of the parameter to be identified.

Particularly, in the least-squares method, it is known that the term $A^T A$ of the following matrix is a sparse matrix. Here, it is assumed that matrix A is an m×m matrix, $a_{ij}$ represents an ij element of matrix A, and n represents the number of measurements.

$$A^T A = \begin{bmatrix} \sum_{b=1}^{n} a_{b1} a_{b1} & \cdots & \sum_{b=1}^{n} a_{b1} a_{bm} \\ \vdots & \ddots & \vdots \\ \sum_{b=1}^{n} a_{bm} a_{b1} & \cdots & \sum_{b=1}^{n} a_{bm} a_{bm} \end{bmatrix}$$

Generally, a person who performs modeling is different from a person who writes analysis code. Thus, studies of how to efficiently perform calculation when sparse matrix $A^T A$ is given have been made. However, the form of a sparse matrix significantly varies or properties thereof locally vary in individual object problems, and thus it is necessary to perform a process of determining a storage scheme by testing some storage schemes at the time of calculation or to perform an experiment for determining a storage scheme in advance. Also, since the same storage scheme is selected for the entire sparse matrix $A^T A$, it is difficult to efficiently store the sparse matrix.

SUMMARY

With the above-described techniques according to the related art, however, it is impossible to take information about a systems model into consideration when storing values in a sparse matrix, and thus a resulting sparse matrix is not adequate from the viewpoint of increasing calculation speed.

Accordingly, embodiments of the invention provide a technique of efficiently storing values in a sparse matrix which is used in the least-squares method for calculating parameters for system identification in order to increase calculation speed, by taking information about a systems model into consideration.

Observation is composed of a plurality of elements. The elements of observation are subsets of observation each being composed of a different group of and a different number of parameters. Thus, in a system according to embodiments of the invention, a sparse matrix used for the least-squares method is divided into small matrices in accordance with the number of elements of observation.

On the other hand, an observation ID is assigned to each element of observation, a parameter ID is assigned to each parameter, and these IDs are associated with parameters of elements in ID mapping. In the system according to an embodiment of the invention, the positions of nonzero elements are determined in accordance with whether or not ID mapping exists, the correspondence between the observation ID and the parameter ID, and the positions of small matrices, and the storage scheme for each small matrix is selected based thereon.

The storage schemes available here include CSR, ELL, DIA, BSR, COO, and DNS. The system according to an embodiment of the invention selects a storage scheme in accordance with conditions, such as whether or not a target element is a diagonal element, whether or not a term decided without ID mapping exists, and whether or not the same ID mapping is referred to.

The system according to an embodiment of the invention selects a storage scheme in this way and stores elements in a matrix, and then performs calculation using a known method, such as the scaled conjugate gradient (SCG) method, thereby obtaining values of parameters.

In embodiments of the invention, elements are stored in a sparse matrix which is used in the least-squares method for calculating parameters for system identification by taking information about a systems model into consideration, and thereby an effect is obtained in which calculation speed of calculating parameters for system identification is increased.

These and other embodiments of the invention will become apparent from the following detailed description of illustrative embodiments thereof, which is to be read in connection with the accompanying drawings.

BRIEF DESCRIPTION OF DRAWINGS

FIG. 13 is a diagram illustrating an example of a storage result for small matrices, according to an embodiment of the invention.

DETAILED DESCRIPTION

Figure 1:
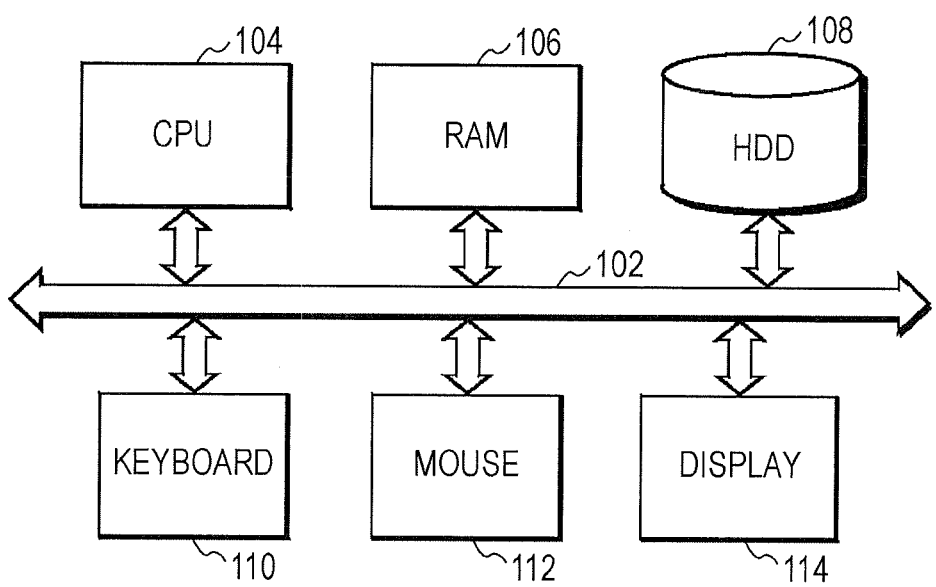
FIG. 1 is a block diagram illustrating a hardware configuration of a system, according to an embodiment of the invention.

Hereinafter, an embodiment of the invention will be described with reference to the drawings. Unless otherwise noted, the same reference numerals denote the same objects throughout the drawings. Note that the description given below is of an embodiment of the invention, and it is not intended to limit the invention to that described below or that shown in one or more of the drawings.

FIG. 1 illustrates a block diagram of computer hardware for realizing a system configuration and a process according to an embodiment of the invention. In FIG. 1, a central processing unit (CPU) 104, a main storage (random access memory (RAM)) 106, a hard disk drive (HDD) 108, a keyboard 110, a mouse 112, and a display 114 are connected to a system path 102. The CPU 104 is preferably based on the architecture of 32 bits or 64 bits, and Pentium™ 4, Core™ 2 Duo, or Xeon™ by Intel Corporation, Athlon™ by AMD Inc., or the like may be used, for example. The main storage 106 preferably has a capacity of 4 GB or more. The HDD 108 desirably has a capacity of, for example, 500 GB or more, so that a large amount data can be stored therein.

Although not individually illustrated, an operating system is stored in the HDD 108 in advance. The operating system may be an arbitrary operating system compatible with the CPU 104, such as Linux™, Windows XP™ or Windows™ 7 by Microsoft Corporation, or Mac OS™ by Apple Inc.

Furthermore, observation data 204 for performing system identification, ID mapping data 206 indicating the correspondence between observation and parameters, a matrix storage routine 208, and a parameter calculation routine 210 based on a stored matrix are stored in the HDD 108. The matrix storage routine 208 and the parameter calculation routine 210 can be created by using an arbitrary existing programming language, such as Java®, C, C++, or C#. The details of these parameters and processing routines will be described below with reference to FIG. 2.

The keyboard 110 and the mouse 112 are used to perform operations or to input characters in the operating system or a main program 202 which is loaded from the HDD 108 to the main storage 106 and is displayed on the display 114.

The display 114 is preferably a liquid crystal display. A display having an arbitrary resolution, such as XGA (a resolution of 1024×768) or UXGA (a resolution of 1600×1200), may be used, for example. Although not illustrated, the display 114 is used to display an operation window for starting a process according to an embodiment of the invention, a parameter calculation result, etc.

Next, a logical configuration of a process according to an embodiment of the invention will be described with reference to the functional block diagram in FIG. 2.

Figure 2:
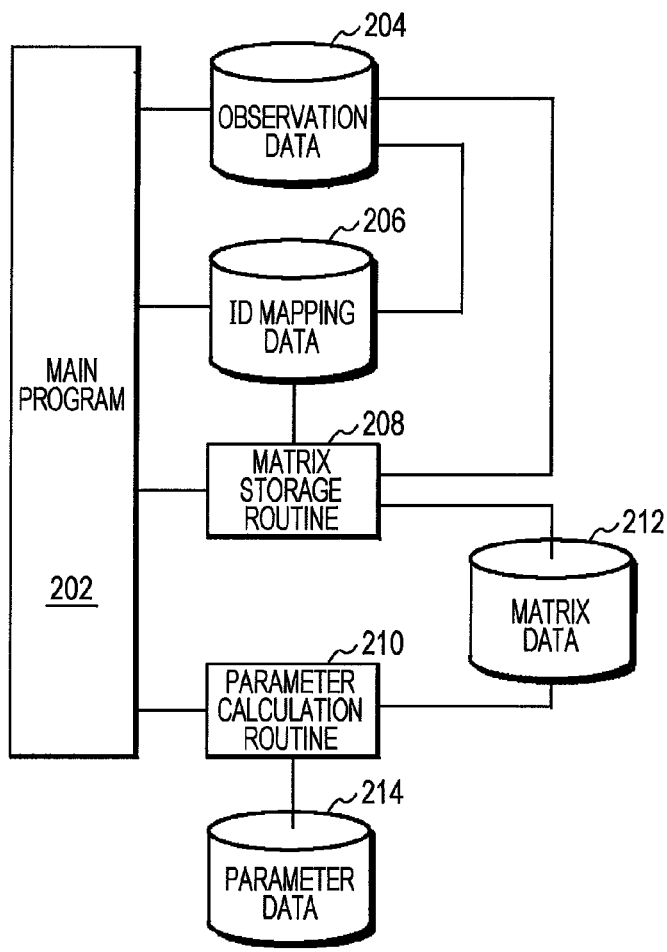
FIG. 2 is a block diagram illustrating a functional configuration of the system, according to an embodiment of the invention.

In FIG. 2, the main program 202 is a program having a function of integrating an entire process, and is used to store data as the observation data 204, create the ID mapping data 206, start the matrix storage routine 208, start the parameter calculation routine 210, or display a result on the display 114, in response to an operation performed by a user.

Figure 3:
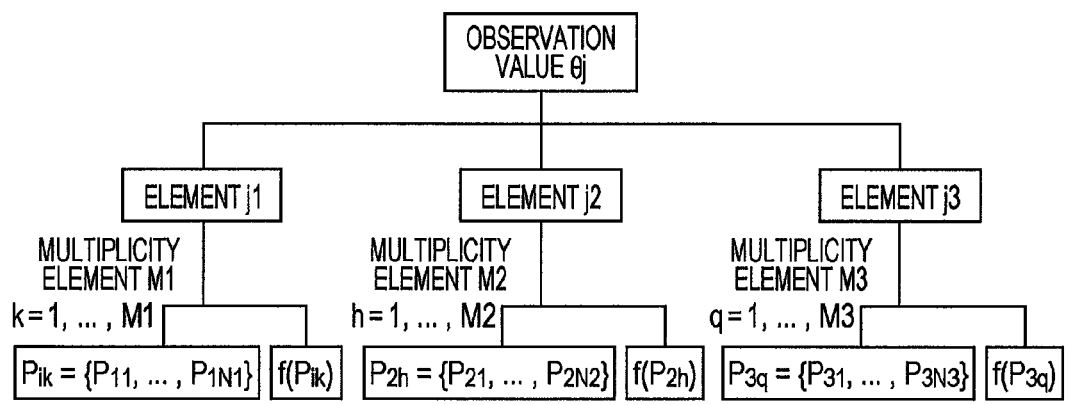
FIG. 3 is a diagram illustrating the correspondence between an observation value and values of parameters, according to an embodiment of the invention.

The observation data 204 holds observation data in the form illustrated in FIG. 3. That is, FIG. 3 illustrates the data structure of the i-th observation value $\theta_i$ (i=1, . . . , m) when it is assumed that observation is performed m times. That is, each observation value is generally composed of a plurality of elements having different parameters. Here, the elements are element j1, element j2, and element j3.

Each element is associated with a set of parameters and a function which gives an observation value. For example, element j1 is associated with parameters $P_{ik}=\{p_{11}, \ldots, P_{1N1}\}$ and function $f(P_{ik})$.

Here, multiplicity corresponds to the number of objects to be measured with the corresponding parameters. For example, when the parameters are (x, y) coordinates, multiplicity M means that there is a set of M parameters $(x_1, y_1)$, $(x_2, y_2), \ldots,$ and $(x_M, y_M)$.

With the elements j1, j2, and j3, $\theta_i$, is calculated using the following expression:

$$\theta_i = \sum_{k=1}^{M_1} f(P_{1k}) + \sum_{h=1}^{M_2} f(P_{2h}) + \sum_{q=1}^{M_3} f(P_{3q}).$$

Figure 4:
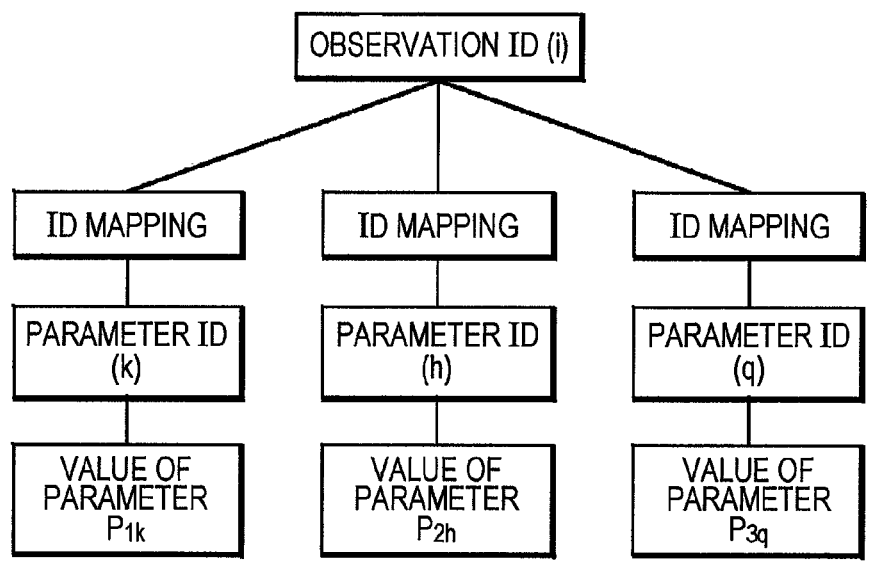
FIG. 4 is a diagram describing the correspondence of ID mapping, according to an embodiment of the invention.

Regarding the ID mapping data 206, a parameter ID is assigned to each parameter set used for observation, an ID is assigned to each of the above-described m observations, and, as illustrated in FIG. 4, the parameter IDs used in the i-th observation are stored as ID mapping in association with the observation data of the observation ID (i) (i=1, ..., m) of the i-th observation. The parameter IDs of parameters used in a certain observation ID can be known with reference to the ID mapping data 206. Also, it can be known whether or not there is an observation ID associated with a certain parameter.

Figure 5:
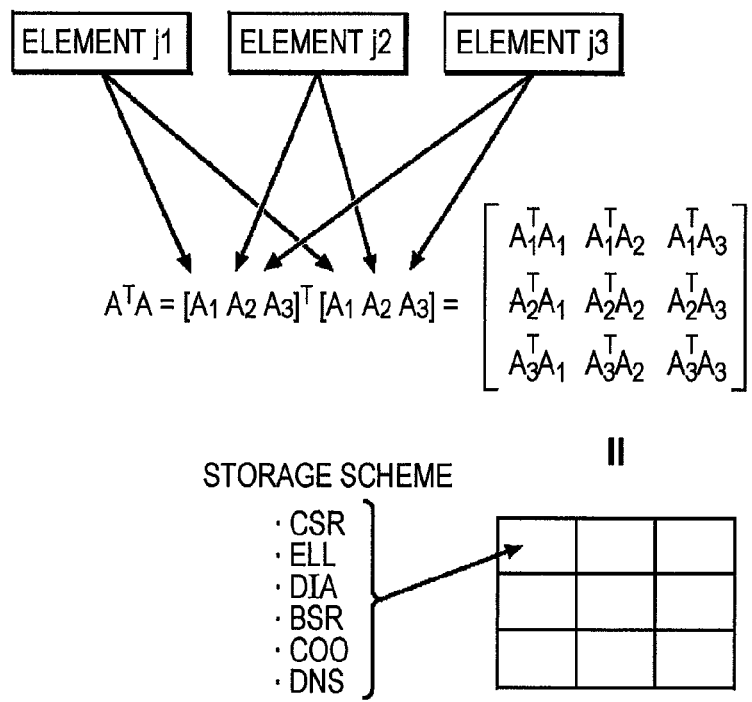
FIG. 5 is a diagram illustrating generation of small matrices from elements of an observation value, and storage schemes used for the small matrices, according to an embodiment of the invention.

A sparse matrix $A^T A$ used for calculation with the least-squares method is divided in the manner illustrated in FIG. 5 in accordance with the number of elements included in an observation value $\theta_i$. That is, in a case where a matrix A is divided into three segments, the sparse matrix $A^T A$ is divided into 3×3=9 small matrices, as illustrated. The matrix storage routine 208 has a function of storing matrix elements with a certain storage scheme to prepare matrix data 212 with reference to the observation data 204 and the ID mapping data 206, on the basis of a process which will be described below with reference to FIG. 6.

The following types of storage schemes may be used in embodiments of the invention:

Compressed Sparse Row (CSR)

A storage scheme in which a sparse matrix is scanned in a row direction and zero elements are omitted. Values of nonzero elements, column numbers of stored nonzero elements, and start positions in individual rows are stored.

ELLPACK/ITPACK (ELL)

The size of one side of a sparse matrix is represented by n, and the maximum number of nonzero elements per row in the sparse matrix is represented by k, and the sparse matrix is stored in a dense matrix of nk. When the number of nonzero elements per row is smaller than k, zero is padded.

Diagonal (DIA)

Values of nonzero diagonal elements, and the offset of each diagonal from the principal diagonal are stored.

Block Sparse Row (BSR)

A sparse matrix is divided into partial matrices (called blocks), each having a size of r×c. With a procedure similar to CSR, nonzero blocks each having at least one nonzero element are stored. All the elements of the nonzero blocks are stored, and block column numbers of the nonzero blocks and start positions of block rows are stored.

Coordinate (COO)

Values of nonzero elements, row numbers, and column numbers are stored for individual nonzero elements.

Dense (DNS)

A storage method for a dense matrix. A sparse matrix is stored as an array.

The parameter calculation routine 210 has a function of calculating parameters for system identification by using the stored matrix data 212 and storing the calculated parameters as parameter data 214 in, preferably, the HDD 108. Preferably, the parameter calculation routine 210 calculates parameters by solving the following expression using a SCG method:

$$\hat{\theta} = (A^T A)^{-1} A^T \epsilon$$

where $\epsilon$ is the difference between observation value $f_i$ and plant model $\hat{f}(x)$ and $\hat{\theta}$ is the estimated value of parameter to be identified. A specific calculation algorithm for this will be described below.

Figure 6:
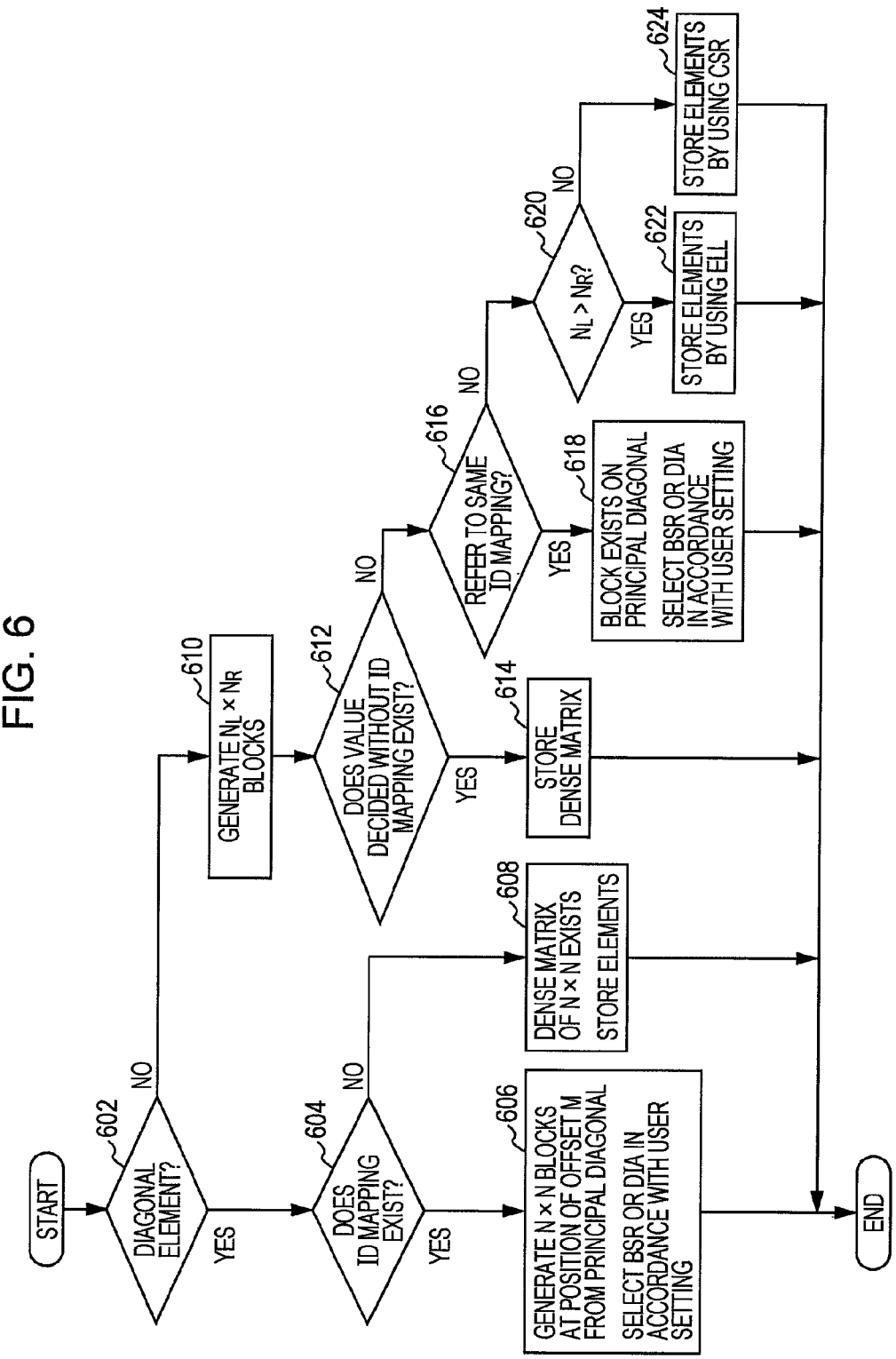
FIG. 6 is a diagram illustrating a flowchart of a process of selecting a storage scheme and storing elements in a small matrix, according to an embodiment of the invention.
Figure 7:
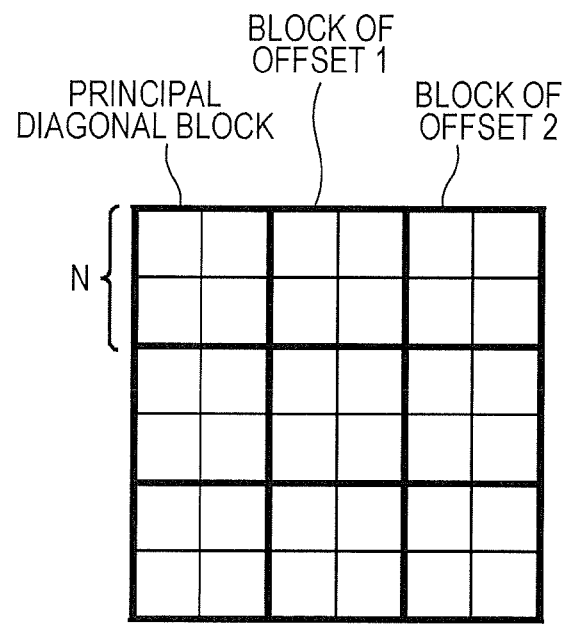
FIG. 7 is a diagram illustrating definition of positions of small matrices, according to an embodiment of the invention.

Next, a process of the matrix storage routine 208 will be described with reference to the flowchart in FIG. 6. Before describing the process, appellation of small matrices is defined with reference to FIG. 7. That is, in FIG. 7, when a matrix is regarded as an aggregation of 3×3 small matrices, a small matrix on the principal diagonal is called a principal diagonal block, a small matrix next to the principal diagonal block is called a block of offset 1, and a small matrix next to the block of offset 1 in the direction opposite to the principal diagonal block is called a block of offset 2. In FIG. 7, N represents the number of parameters defined by values of parameters. This corresponds to the number of parameters $P_{ik}=\{p_{11}, \ldots, p_{1N1}\}$ in FIG. 3. Here, each small matrix is divided into 2×2 segments for convenience. Note that the discussion given here is generally applicable to not only an aggregation of 3×3 small matrices but also an aggregation of an arbitrary larger number of small matrices.

Referring back to FIG. 6, note that the matrix storage routine 208 sequentially performs the process of the flowchart in FIG. 6 on the small matrices.

In step 602, the matrix storage routine 208 determines whether or not a target small matrix is a diagonal element, that is, on the principal diagonal. If the target small matrix is a diagonal element, the matrix storage routine 208 determines in step 604 whether or not ID mapping exists.

Figure 8:
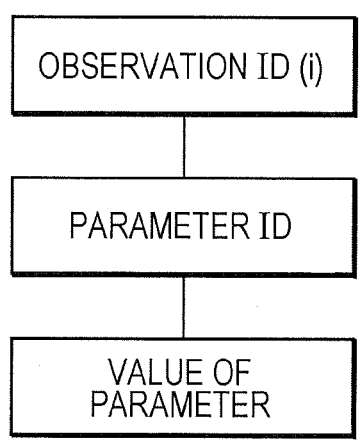
FIG. 8 is a diagram illustrating the correspondence between observation and a value of a parameter when ID mapping does not exist, according to an embodiment of the invention.

Here, a case where ID mapping does not exist is a case where, as illustrated in FIG. 8, a parameter is defined with respect to an observation ID and the same parameter index is constantly used regardless of an observation ID (for example, constant term).

Figure 9:
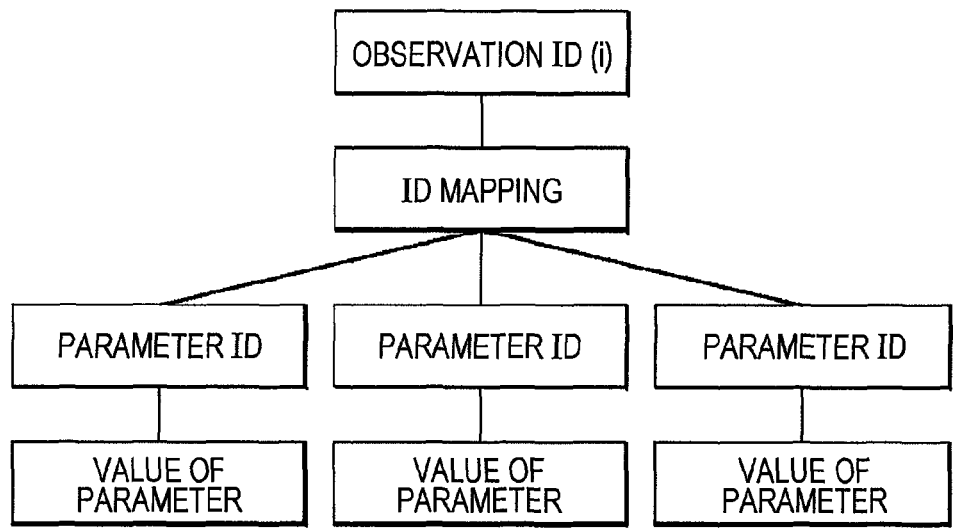
FIG. 9 is a diagram illustrating the correspondence between observation and values of parameters when ID mapping exists, according to an embodiment of the invention.

On the other hand, a case where ID mapping exists is a case where, as illustrated in FIG. 9, parameters are defined with respect to an observation ID and the values of the parameters are decided through ID mapping.

If ID mapping exists, in step 606, the matrix storage routine 208 generates N rows×N columns of blocks at the position of offset M from the principal diagonal, selects BSR or DIA in accordance with user setting, and stores elements. Here, M represents the value of a parameter index, and corresponds to M1, M2, and M3 in FIG. 3.

If ID mapping does not exist, in step 608, the matrix storage routine 208 determines that there is a dense matrix (DNS) of N rows×N columns, and stores elements.

If it is determined in step 602 that the target small matrix is not a diagonal element, the matrix storage routine 208 generates $N_L \times N_R$ blocks in step 610. Here, $N_L$ and $N_R$ are the numbers of parameters defined by a left element and a right element of matrix multiplication, respectively, in an off-diagonal element.

Figure 10:
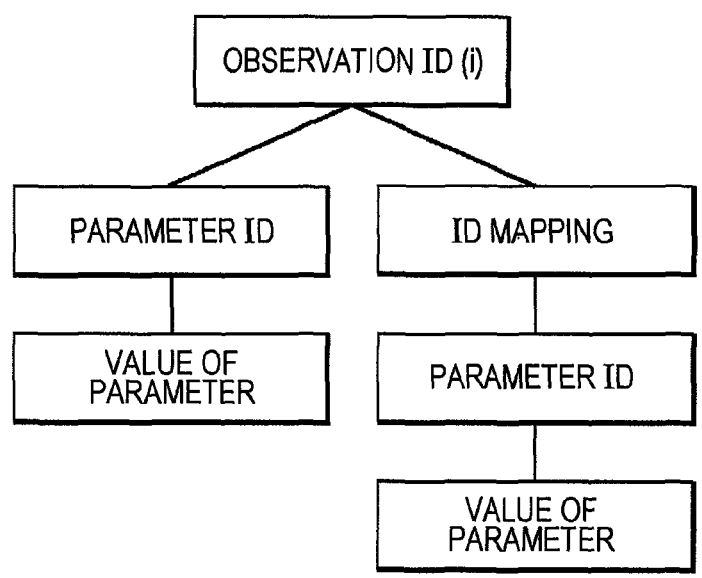
FIG. 10 is a diagram illustrating the correspondence between observation and values of parameters when ID mapping does not exist and ID mapping exists, according to an embodiment of the invention.

In step 612, the matrix storage routine 208 determines whether or not a value decided without ID mapping exists. Here, a case where a value decided without ID mapping exists is the case illustrated in FIG. 10.

If a value decided without ID mapping exists, the matrix storage routine 208 stores a dense matrix in step 614.

If a value decided without ID mapping does not exist, the matrix storage routine 208 determines in step 616 whether or not the same ID mapping is referred to.

Figure 11:
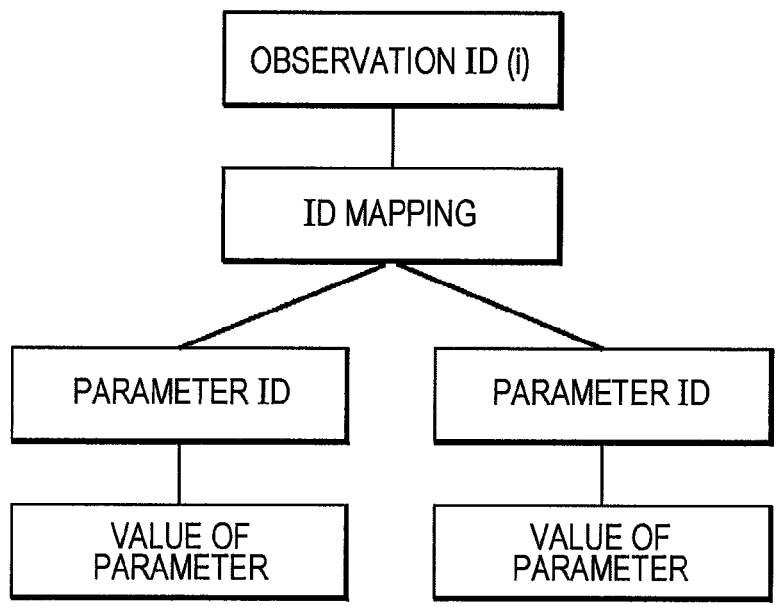
FIG. 11 is a diagram in a case where single ID mapping includes a plurality of values of parameters, according to an embodiment of the invention.

A case where the same ID mapping is referred to is the case illustrated in FIG. 11, for example. More specifically, for example, in the case of measuring a position (x, y) as a target to be measured, if element j1 includes a measurement value of x, element j2 includes a measurement value of y, and element j3 includes a measurement value of T, both refer to the same ID mapping.

Figure 12:
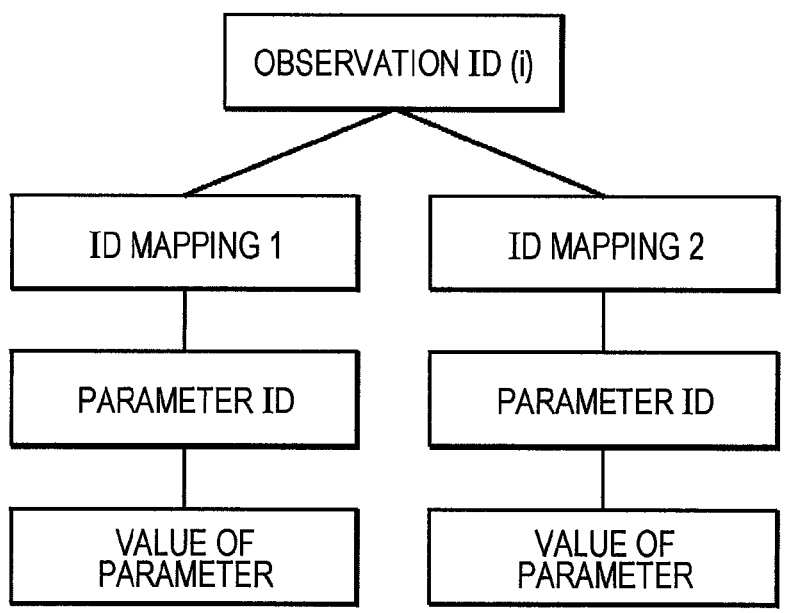
FIG. 12 is a diagram in a case where a plurality of ID mappings exists, according to an embodiment of the invention.

A case where different ID mappings are referred to is the case illustrated in FIG. 12, for example. For example, in the case of individually measuring a position (x, y) and temperature T as targets to be measured, the position (x, y) is associated with measurement data by ID mapping 1, and temperature T is associated with measurement data by ID mapping 2.

If it is determined that the same ID mapping is referred to, the matrix storage routine 208 determines in step 618 that the block is on the principal diagonal, and selects BSR or DIA in accordance with user setting.

If the same ID mapping is not referred to (the case illustrated in FIG. 12), the matrix storage routine 208 determines in step 620 whether or not $N_L > N_R$. If $N_L > N_R$, the matrix storage routine 208 stores elements by using ELL in step 622. Otherwise, the matrix storage routine 208 stores elements by using CSR in step 624.

Figure 13:
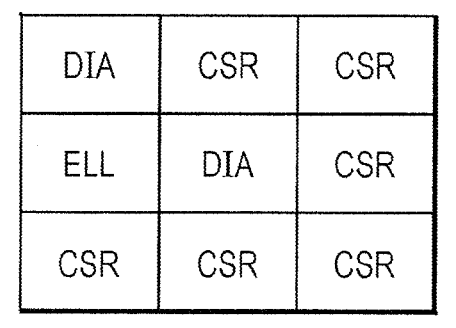

FIG. 13 illustrates an example of storage schemes selected in this manner.

Next, an algorithm of the SCG method executed by the parameter calculation routine 210 will be described. This algorithm is based on, for example, Hayami and Harada, "The use of the scaled conjugate gradient algorithm on vector processors", research reports of Information Processing Society of Japan, high-performance computing (HPC), Vol. 1986, No. 40 (1986-HPC-017) pp. 1-6, 1986, which is incorporated by reference herein.

Here, when A represents a sparse matrix, x represents a parameter vector to be obtained, and b represents an observation value vector, linear simultaneous equations Ax=b are obtained. Then, scaling is performed by using diagonal terms of the matrix A, and the conjugate gradient method (CG method) is applied. For this purpose, an initial value is given first in the following expressions:

$$D^{-1} = \text{diag}\left[\frac{1}{a_{11}} \frac{1}{a_{22}} \cdots \frac{1}{a_{nn}}\right]$$
$$r_1 = b - Ax$$
$$p_1 = D^{-1}r_1$$
$$i = 1, 2, 3, \ldots$$

Next, x is updated by repeating the following expressions, and calculation stops when convergence is reached. In the following expressions, the form (A, B) is defined as calculating the inner product of vector A and vector B.

$$\alpha_i = \frac{(r_i, D^{-1}r_i)}{(p_i, Ap_i)}$$
$$x_{i+1} = x_i + \alpha_i p_i$$
$$r_{i+1} = r_i - \alpha_i p_i$$
$$\beta_i = \frac{(r_{i+1}, D^{-1}r_{i+1})}{(r_i, D^{-1}r_i)}$$
$$p_{i+1} = D^{-1}r_{i+1} + \beta_i p_i$$

When calculation converges, the parameter calculation routine 210 writes parameters as a calculation result, which is the parameter data 214, onto the HDD 108, preferably. The parameter calculation routine 210 may use an arbitrary method for calculating simultaneous linear equations in which a certain convergence speed can be expected, such as an Incomplete Cholesky Conjugate Gradient (ICCG) method or a modified ICCG (MICCG) method, other than the SCG method.

The invention has been described above in accordance with a specific embodiment. The invention, however, is not limited solely to the particular embodiment described above and shown in the drawings. One of ordinary skill in the art will readily appreciate that various modifications can be considered within the scope of the technical spirit of the invention. For example, the size of a matrix and the number of parameters may be arbitrarily set, and also the hardware of a computer being used may have an arbitrary available platform and architecture.

What is claimed is:

1. A method comprising:
   preparing observation data, the observation data comprising a plurality of observations associated with different sets of parameters, the parameter sets being associated with corresponding observation models that give respective observation values utilizing a corresponding one of the parameter sets;
   creating a plurality of ID mappings, wherein each ID mapping maps a given one of the plurality of observations to at least one of the parameter sets;
   formulating a matrix to calculate the values of parameters in the parameter sets using a least-squares method, the matrix being divided into a plurality of small matrices based on a number of the different parameter sets associated with the plurality of observations;
   selecting one of a plurality of different storage schemes for respective ones of the plurality of small matrices based on the ID mappings for the parameter sets; and
   utilizing the selected storage schemes for storing the plurality of small matrices in a memory;
   wherein the method is performed by at least one processing device comprising a processor coupled to the memory;
   wherein selecting one of the plurality of different storage schemes comprises, for a target one of the plurality of small matrices:
      determining if the target small matrix is a diagonal small matrix, wherein the diagonal small matrix comprises a small matrix formed from multiplying the transpose of a given one of the parameter sets by the given parameter set; and
      determining if an ID mapping exists for the given parameter set;
      responsive to determining that an ID mapping does not exist for the given parameter set, selecting a dense storage scheme for the target small matrix; and
      responsive to determining that an ID mapping does exist for the given parameter set:
         generating N×N blocks at a position of offset M from a principal diagonal of the target small matrix, where N is the number of parameters in the given parameter set and M is an index corresponding to the parameters in the given parameter set; and
         selecting one of a block sparse row storage scheme and a diagonal storage scheme for the N×N blocks.

2. The method of claim 1, wherein creating the plurality of ID mappings comprises:

determining if respective ones of the parameter sets are constant for the plurality of observations; and refraining from creating an ID mapping for parameter sets determined to be constant for the plurality of observations.

3. The method of claim 1, wherein responsive to determining that the target small matrix is not a diagonal matrix:

generating $N_L \times N_R$ blocks, wherein the target small matrix is formed from multiplying a transpose of a first one of the parameter sets by a second one of the parameter sets, L denoting the number of parameters in the first parameter set and R denoting the number of parameters in the second parameter set; and determining if an ID mapping exists for the first parameter set and the second parameter set.

4. The method of claim 3, wherein responsive to determining that an ID mapping does not exist for the first parameter set and the second parameter set, selecting a dense storage scheme for the $N_L \times N_R$ blocks of the target small matrix.

5. The method of claim 3, wherein responsive to determining that an ID mapping exists for the first parameter set and the second parameter set, determining whether the ID mapping for the first parameter set is the same as the ID mapping for the second parameter set.

6. The method of claim 5, wherein responsive to determining that the ID mapping for the first parameter set is the same as the ID mapping for the second parameter set, determining that a block exists on a principal diagonal and selecting one of a block sparse row storage scheme and a diagonal storage scheme for the $N_L \times N_R$ blocks of the target small matrix.

7. The method of claim 5, wherein responsive to determining that the ID mapping for the first parameter set is different from the ID mapping for the second parameter set:

determining if L is greater than R;

responsive to determining that L is greater than R, selecting an ELLPACK/ITPACK storage scheme for the $N_L \times N_R$ blocks of the target small matrix; and responsive to determining that R is at least as large as L, selecting a compressed sparse row storage scheme for the $N_L \times N_R$ blocks of the target small matrix.

8. The method of claim 1, further comprising utilizing a scaled conjugate gradient method to solve the least-squares method using the matrix.

9. A computer program product comprising a non-transitory computer readable storage medium having computer readable program code embodied therewith which, when executed, causes a computer to perform the method of:

preparing observation data, the observation data comprising a plurality of observations associated with different sets of parameters, the parameter sets being associated with corresponding observation models that give respective observation values utilizing a corresponding one of the parameter sets;

creating a plurality of ID mappings, wherein each ID mapping maps a given one of the plurality of observations to at least one of the parameter sets;

formulating a matrix to calculate the values of parameters in the parameter sets using a least-squares method, the matrix being divided into a plurality of small matrices based on a number of the different parameter sets associated with the plurality of observations;

selecting one of a plurality of different storage schemes for respective ones of the plurality of small matrices based on the ID mappings for the parameter sets; and utilizing the selected storage schemes for storing the plurality of small matrices in a memory;

wherein selecting one of the plurality of different storage schemes comprises, for a target one of the plurality of small matrices:

determining if the target small matrix is a diagonal small matrix, wherein the diagonal small matrix comprises a small matrix formed from multiplying the transpose of a given one of the parameter sets by the given parameter set; and determining if an ID mapping exists for the given parameter set;

responsive to determining that an ID mapping does not exist for the given parameter set, selecting a dense storage scheme for the target small matrix; and responsive to determining that an ID mapping does exist for the given parameter set:

generating $N \times N$ blocks at a position of offset M from a principal diagonal of the target small matrix, where N is the number of parameters in the given parameter set and M is an index corresponding to the parameters in the given parameter set; and selecting one of a block sparse row storage scheme and a diagonal storage scheme for the $N \times N$ blocks.

10. The computer program product of claim 9, wherein creating the plurality of ID mappings comprises:

determining if respective ones of the parameter sets are constant for the plurality of observations; and refraining from creating an ID mapping for parameter sets determined to be constant for the plurality of observations.

11. The computer program product of claim 9, wherein responsive to determining that the target small matrix is not a diagonal matrix:

generating $N_L \times N_R$ blocks, wherein the target small matrix is formed from multiplying a transpose of a first one of the parameter sets by a second one of the parameter sets, L denoting the number of parameters in the first parameter set and R denoting the number of parameters in the second parameter set; and determining if an ID mapping exists for the first parameter set and the second parameter set;

responsive to determining that an ID mapping does not exist for the first parameter set and the second parameter set, selecting a dense storage scheme for the $N_L \times N_R$ blocks of the target small matrix;

responsive to determining that an ID mapping exists for the first parameter set and the second parameter set, determining whether the ID mapping for the first parameter set is the same as the ID mapping for the second parameter set;

responsive to determining that the ID mapping for the first parameter set is the same as the ID mapping for the second parameter set, determining that a block exists on a principal diagonal and selecting one of a block sparse row storage scheme and a diagonal storage scheme for the $N_L \times N_R$ blocks of the target small matrix;

responsive to determining that the ID mapping for the first parameter set is different from the ID mapping for the second parameter set:

determining if L is greater than R;

responsive to determining that L is greater than R, selecting an ELLPACK/ITPACK storage scheme for the $N_L \times N_R$ blocks of the target small matrix; and responsive to determining that R is at least as large as L, selecting a compressed sparse row storage scheme for the $N_L \times N_R$ blocks of the target small matrix.

12. A system comprising:
a memory storing observation data, the observation data comprising a plurality of observations associated with different sets of parameters, the parameter sets being associated with corresponding observation models that give respective observation values utilizing a corresponding one of the parameter sets;
a processor coupled to the memory and configured:
to create a plurality of ID mappings, wherein each ID mapping maps a given one of the plurality of observations to at least one of the parameter sets;
to formulate a matrix to calculate the values of parameters in the parameter sets using a least-squares method, the matrix being divided into a plurality of small matrices based on a number of the different parameter sets associated with the plurality of observations;
to select one of a plurality of different storage schemes for respective ones of the plurality of small matrices based on the ID mappings for the parameter sets; and
to utilize the selected storage schemes for storing the plurality of small matrices in the memory;
wherein the processor is configured to select one of the plurality of different storage schemes by, for a target one of the plurality of small matrices:
determining if the target small matrix is a diagonal small matrix, wherein the diagonal small matrix comprises a small matrix formed from multiplying the transpose of a given one of the parameter sets by the given parameter set;
determining if an ID mapping exists for the given parameter set;
responsive to determining that an ID mapping does not exist for the given parameter set, selecting a dense storage scheme for the target small matrix; and
responsive to determining that an ID mapping does exist for the given parameter set:
generating N×N blocks at a position of offset M from a principal diagonal of the target small matrix, where N is the number of parameters in the given parameter set and M is an index corresponding to the parameters in the given parameter set; and
selecting one of a block sparse row storage scheme and a diagonal storage scheme for the N×N blocks.

13. The system of claim 12, wherein the processor is configured to create the plurality of ID mappings by:
determining if respective ones of the parameter sets are constant for the plurality of observations; and
refraining from creating an ID mapping for parameter sets determined to be constant for the plurality of observations.

14. The system of claim 12, wherein the processor is further configured, responsive to determining that the target small matrix is not a diagonal matrix:
to generate $N_L \times N_R$ blocks, wherein the target small matrix is formed from multiplying a transpose of a first one of the parameter sets by a second one of the parameter sets, L denoting the number of parameters in the first parameter set and R denoting the number of parameters in the second parameter set;
to determine if an ID mapping exists for the first parameter set and the second parameter set;
responsive to determining that an ID mapping does not exist for the first parameter set and the second parameter set, to select a dense storage scheme for the $N_L \times N_R$ blocks of the target small matrix;
responsive to determining that an ID mapping exists for the first parameter set and the second parameter set, to determine whether the ID mapping for the first parameter set is the same as the ID mapping for the second parameter set;
responsive to determining that the ID mapping for the first parameter set is the same as the ID mapping for the second parameter set, to determine that a block exists on a principal diagonal and selecting one of a block sparse row storage scheme and a diagonal storage scheme for the $N_L \times N_R$ blocks of the target small matrix;
responsive to determining that the ID mapping for the first parameter set is different from the ID mapping for the second parameter set:
to determine if L is greater than R;
responsive to determining that L is greater than R, to select an ELLPACK/ITPACK storage scheme for the $N_L \times N_R$ blocks of the target small matrix; and
responsive to determining that R is at least as large as L, to select a compressed sparse row storage scheme for the $N_L \times N_R$ blocks of the target small matrix.

15. The system of claim 12, wherein the processor is further configured to utilize a scaled conjugate gradient method to solve the least-squares method using the matrix.

* * * * *